Figure 1:
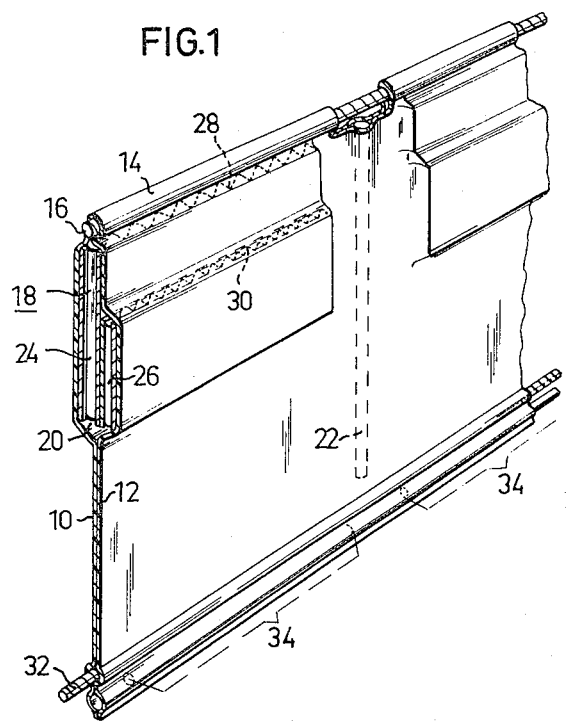

United States Patent [19]
Larsson

[11] 3,757,526
[45] Sept. 11, 1973

[54] FLOATING BOOM STRUCTURES

[75] Inventor: Erik Johan Larsson, Gamleby, Sweden

[73] Assignee: Barracudaverken AB, Gamleby, Sweden

[22] Filed: Oct. 30, 1972

[21] Appl. No.: 301,720

[30] Foreign Application Priority Data
Nov. 4, 1971 Sweden.............................. 14097/71

[52] U.S. Cl. ................................................. 61/1 F
[51] Int. Cl. ............................................ E02b 15/04
[58] Field of Search ............................. 61/1 F, 5, 6; 210/242, DIG. 21

[56] References Cited
UNITED STATES PATENTS

| | | | |
|---|---|---|---|
| 3,592,007 | 7/1971 | Renner | 61/1 F |
| 3,613,376 | 10/1971 | Midby | 61/1 F |
| 3,686,870 | 8/1972 | Blomberg | 61/1 F |
| 3,718,001 | 2/1973 | Harper | 61/1 F |

Primary Examiner—Mervin Stein
Assistant Examiner—Philip C. Kannan
Attorney—Ralph E. Parker et al.

[57] ABSTRACT

An oil boom comprising an elongate screen of plastics foil material provided with buoyant bodies and weights to hold the boom in a substantially vertical position when afloat in the water, with a portion of the upper edge portion of the boom above the surface of said water. The boom comprises two superimposed sheets of plastics foil material which are welded together at a number of sequentially arranged points in the longitudinal direction of the boom to form substantially rectangular closed pockets located on the upper half of the boom in its position of use. Each pocket contains one filling body which extends the pocket to form a buoyant body of requisite buoyancy, said filling body being constructed of corrugated cardboard.

7 Claims, 4 Drawing Figures

PATENTED SEP 11 1973 3,757,526

FLOATING BOOM STRUCTURES

The present invention relates to an oil boom of the type comprising an elongate screen made of reinforced plastics foil and provided with buoyant bodies and weights for maintaining the boom in a generally vertical position when afloat, with a portion of the upper edge portion of the boom located above the surface of the water.

The object of the invention is to provide a boom structure or unit which is light in weight and of small volume and which can be readily connected to similar structures to form a composite boom of desired length, and which has good sea-going characteristics, can be readily towed after use, lends itself to manufacture from a relatively inexpensible material using automatic manufacturing methods and which can be burned without economic detriment after being used only one time.

These desiderata are fulfilled with the boom of the present invention, which is mainly characterized in that the boom comprises two superimposed sheets of plastics foil material which are welded together at a number of sequentially arranged points in the longitudinal direction of the boom to form substantially rectangular closed pockets located on the upper half of the boom in its position of use, and in that each pocket contains one filling body which extends the pocket to form a bouyant body of requisite buoyancy, said filling body being constructed of corrugated cardboard.

The boom is suitably made of a reinforced plastics foil folded double at the upper edge surface of the boom. A plastics rope is inserted at the upper edge surface of the boom. Filling bodies are mounted in position in spaced side-by-side relationship and the two halves of the folded foil are welded together around the filling bodies to enclose the same in sealed pockets. At the lower edge portion of the boom there is inserted a further plastics rope which is secured by welding together the foil halves on both sides of the rope. Finally, a number of reinforcing rods are arranged at the lower edge of the boom and fixed in position by welding together the foil portions. Between the buoyant bodies there is arranged a number of vertically extending rods of a plastics material, the rods being fixed in position by welding together the foil portions on both sides of the rods. The plastics rods are welded fast at the end edges of the boom to form bead-like end members. The foil, the rope and the rods are suitably made of polyethylene which can be burned without detriment from the aspect of environmental pollution. The filling bodies are made of corrugated cardboard which can be readily destroyed by burning.

Figure 2:
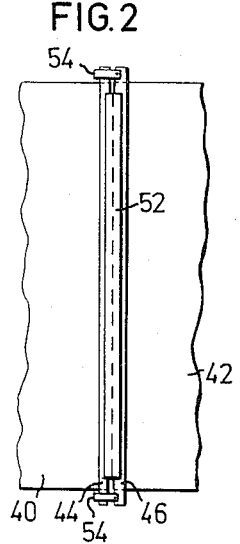
Figure 3:
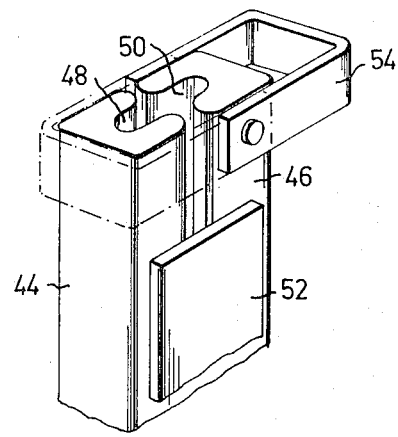
Figure 4:
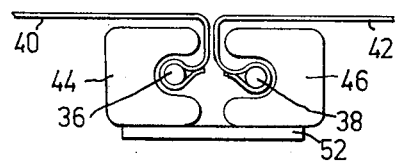

The invention will now be described with reference to the accompanying drawing, further features and advantages of the invention being made apparent therewith. In the drawing, FIG. 1 is a diagrammatic, fractural view in perspective of a number of sections of a boom structure according to the invention, FIG. 2 illustrates the end portions of two boom structures joined together by means of a coupling, FIG. 3 illustrates in perspective the upper end of the coupling shown in FIG. 2, and FIG. 4 illustrates the arrangement of FIG. 3 in plan view with the ends of two boom sructures coupled together.

The boom structure of FIG. 1 comprises two superimposed sheets of reinforced plastics material 10, 12 obtained by folding double a web of plastics foil.

At the upper edge 14 of the foil sheets is inserted a plastics rope 16 beneath which is inserted a number of filling bodies 18, the position of which is fixed by welding the foil sheets around respective filling bodies such as to enclose said bodies in a closed pocket 20.

Inserted between the pockets are vertically extending plastics rods 22 which are fixed in position by welds made on either side thereof. The purpose of the rods is to stiffen the boom when in use.

Each filling body comprises two substantially rectangular plates 24, 26 made of cellular cardboard and bonded together with a suitable adhesive. Each plate consists of two outer layers and an intermediate layer of corrugated cardboard 28, 30. The plates are of the same thickness and length but have different height such that the lower edges of the plates lie generally edge-to-edge with each other. In this way the lower half of the filling bodies is approximately double the thickness of its upper half so that the portion of the pocket accommodating the section of the body submerged in the water and forming a buoyant body obtains the greater volume, while the larger portion of the upper half of the filling body is only half as thick and is intended to lie at least partially above the water to form a screen for screening-off any oil present on the surface thereof.

The described construction of the floating body formed by the pocket extended by the filling body provides a simple and inexpensive structure with the use of an inexpensive filling material which in addition is light in weight.

To provide the desired rigidity of the buoyant bodies, the pleats of the corrugated cardboard plates 24, 26 are arranged with their longitudinal extension at right angles to the longitudinal extension of the boom, as illustrated in FIG. 1.

Arranged and securely welded in the lower edge portion of the boom is a further plastics rope 32, and arranged beneath the rope is a number of reinforcing rods serving as weights to maintain the boom in a vertical position when afloat in the water. The reinforcing rods have approximately the same length as the buoyant bodies, whereby the boom can be folded to form a pack, by folding the boom backwards and forwards at the vertical rods 22. A folded boom can be readily stored in a transport box of such construction that the short sides of the box and the lid can be readily removed. The boom can be rapidly drawn from a box of this construction and connected to a motor boat, for example, by means of the ropes 16, 32. The boom will thereby lie on the surface of the water while being towed and offers but small resistance to the water, thereby enabling the boom to be towed at relatively high speeds.

The polyethylene foil used is suitably a 0.3 mm thick, double layer polyethylene foil. The thickness of the cardboard plates is, for example, 6 mm, so that the largest thickness of respective buoyant bodies is 12 mm. The ropes suitably have a diameter of approximately 6 mm. The distance between the vertical rods is, for example, 0.9 m and the height of the boom is, for example, 0.7 m.

Each boom unit may have a length of 25 to 50 m and comprises a number of sections, each having its respective buoyant body 18. Two boom units can suitably be coupled together by means of the coupling illustrated in FIGS. 2 to 4.

Each boom unit is provided at either end thereof with a vertically extending rod securely welded along the whole of the length of the edge surface of the boom and forms a bead-like edge member. Two such bead-like edge members 36, 38 of two boom units 40, 42 are illustrated in FIG. 4.

The coupling comprises two substantially rectangular strips 44, 46 having a longitudinally extending groove 48, 50 arranged in one side thereof. With the embodiment illustrated in FIG. 3, the grooves face towards each other. The strips are pivotally connected together by means of a plastics strap 52 extending along the major portion of the length of the strips and securely welded to both of said strips, as illustrated in FIGS. 2 and 3. The plastics strap, while holding the strips together as shown, acts as a hinge to permit the strips to be swung away from each other to expose the grooves 48, 50.

The strips extend above and below the upper and lower edge surfaces of the boom units 40, 42 as illustrated in FIG. 2.

Arranged at the upper and lower ends of the two strips is a pivotable stirrup structure 54 which is mounted on one strip 46 and which can be swung from its open position, illustrated in full lines in FIG. 3, to a latching position, illustrated with chain lines, in which the two strips are latched in a position with the grooves facing towards each other.

In the embodiment illlustrated in FIGS. 2 and 4, the end edge surface 36 of one boom unit 40 is inserted in the groove 48 of one strip 46 to which said boom unit is firmly joined as by gluing, for example. When the strips are swung away from each other, the second groove 50 is thus free and readily receives the bead-like edge member 38 of the other boom unit. Subsequent to placing said edge member into the groove, the strips are swung towards each other to the position illustrated in FIG. 3, and the upper and lower stirrup structures 54 are moved to their latching position.

What is claimed is:

1. An oil boom comprising an elongate screen of plastics foil material provided with buoyant bodies and weights to hold the boom in a substantially vertical position when afloat in the water, with a portion of the upper edge portion of the boom above the surface of said water, characterized in that the boom comprises two superimposed sheets of plastics foil material which are welded together at a number of sequentially arranged points in the longitudinal direction of the boom to form substantially rectangular closed pockets located on the upper half of the boom in its position of use, and in that each pocket contains one filling body which extends the pocket to form a buoyant body of requisite buoyancy, said filling body being constructed of corrugated cardboard.

2. An oil boom according to claim 1, characterized in that the pleats of the corrugated cardboard extend perpendicularly to the longitudinal direction of the boom.

3. An oil boom according to claim 2, characterized in that the filling body comprises two substantially rectangular corrugated cardboard plates bonded together, said plates being of substantially the same length but of different height, and wherein the lower edges of the plates are in approximate edge-to-edge relationship so that at least the major portion of the upper half of the pocket and filling body has a smaller thickness than its lower half.

4. An oil boom according to claim 1, characterized in that a plastics rope extending between the end edge surfaces of the boom is arranged at the upper and lower edge surfaces of said boom.

5. An oil boom according to claim, characterized in that arranged at both ends of the boom is a plastics rod which forms a bead-like edge member intended to be coupled with a corresponding bead-like end member on adjacent boom.

6. An oil boom according to claim 5, characterized in that one bead-like edge member of the boom is secured in a groove in one side of a strip extending along said end edge surface and externally of the upper and lower edge of the boom, and that the strip is hingedly connected with a corresponding strip having a groove in one side thereof in a manner such that the strips can be swung together with the grooves facing towards each other, whereby the bead-like end member of an adjacent boom is coupled to said firstmentioned boom when said bead-like end member is placed in the groove of the lastmentioned latching strip.

7. A boom according to claim 6, characterized in that pivotally mounted to the upper and lower ends of the latching strips is a stirrup structure which can be moved to a position over the ends of the two strips to latch the same together in a position with the grooves facing towards each other.

* * * * *